June 21, 1938. R. B. DORWARD 2,121,189
CRANE EXCAVATOR
Filed Dec. 2, 1936 5 Sheets-Sheet 2
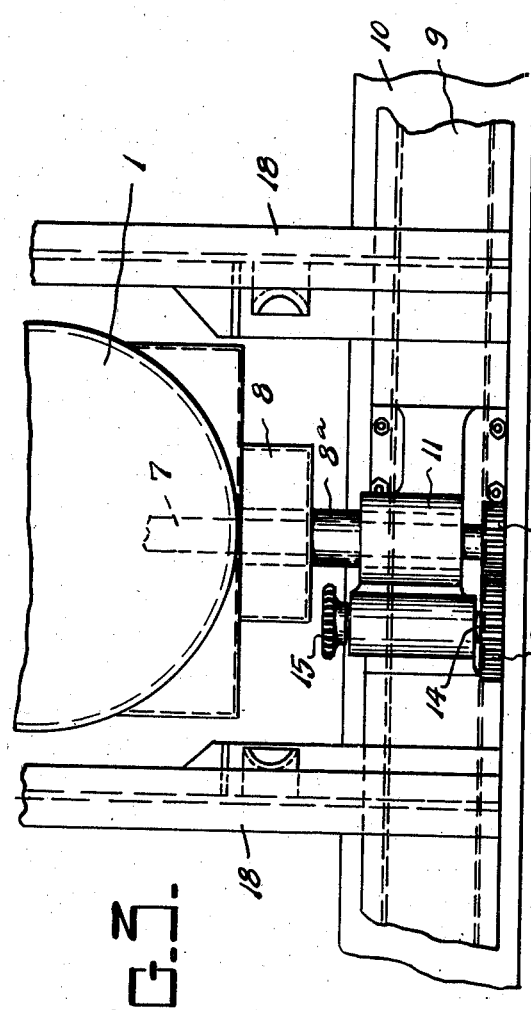
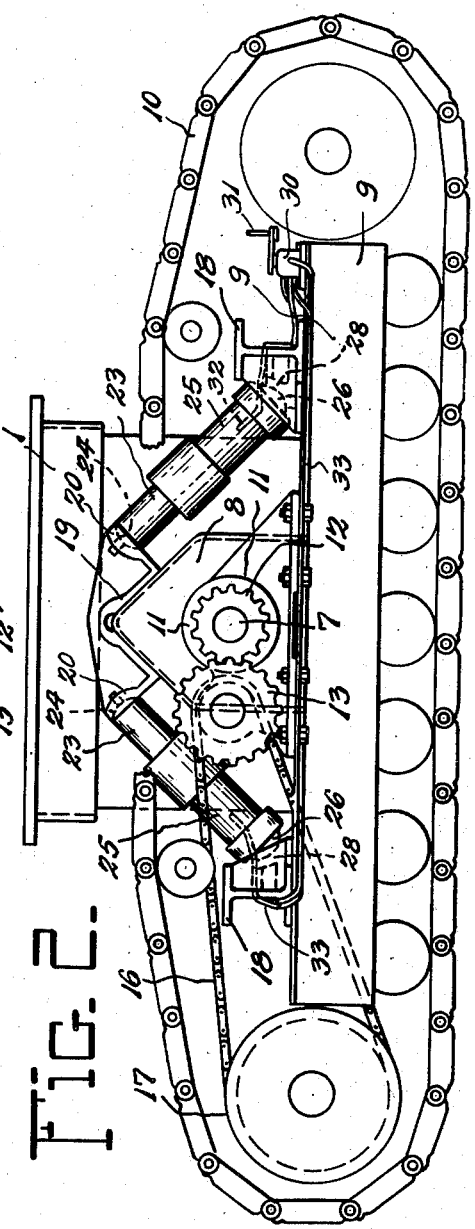
Inventor
RAYMOND B. DORWARD.
By Robb & Robb
Attorneys

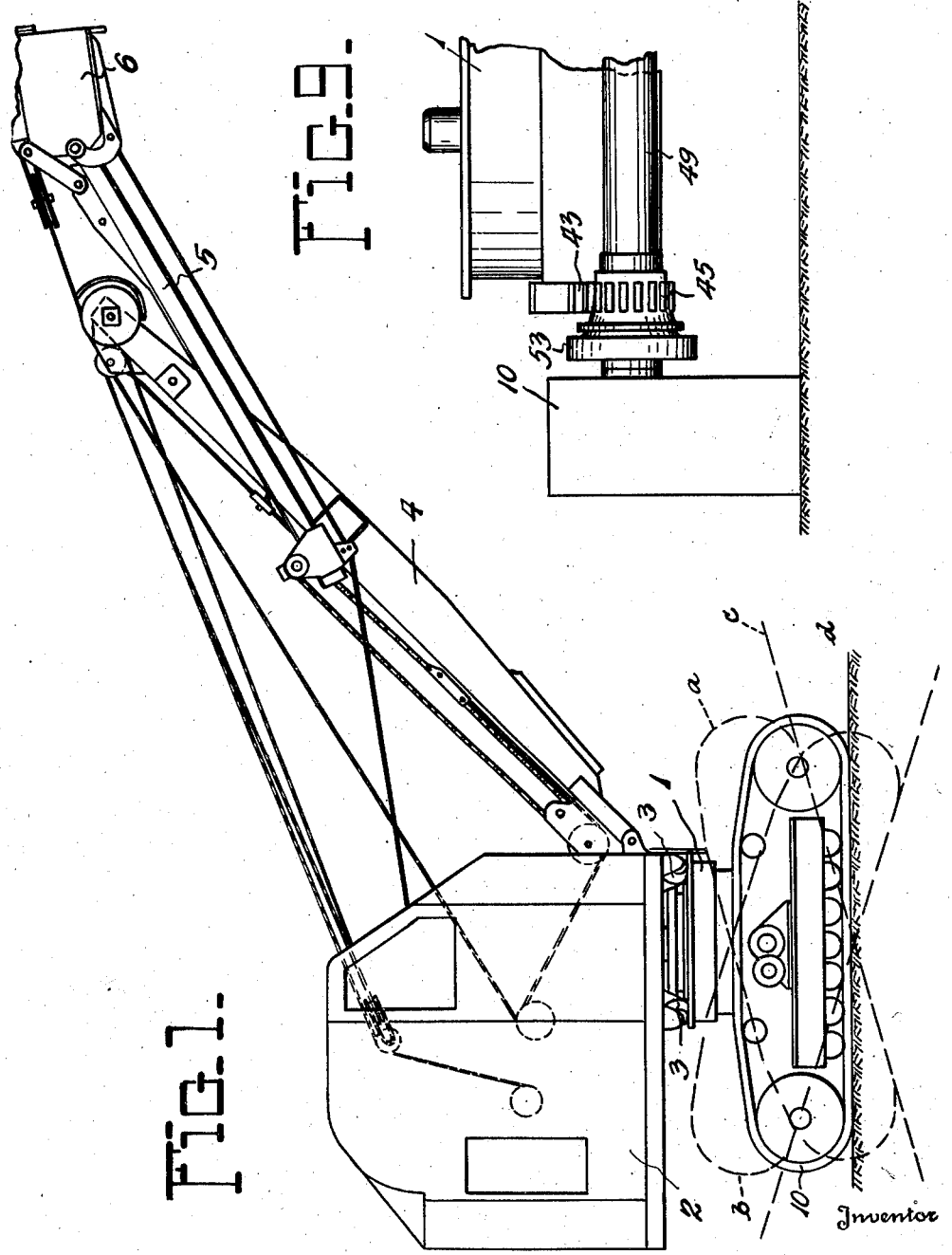

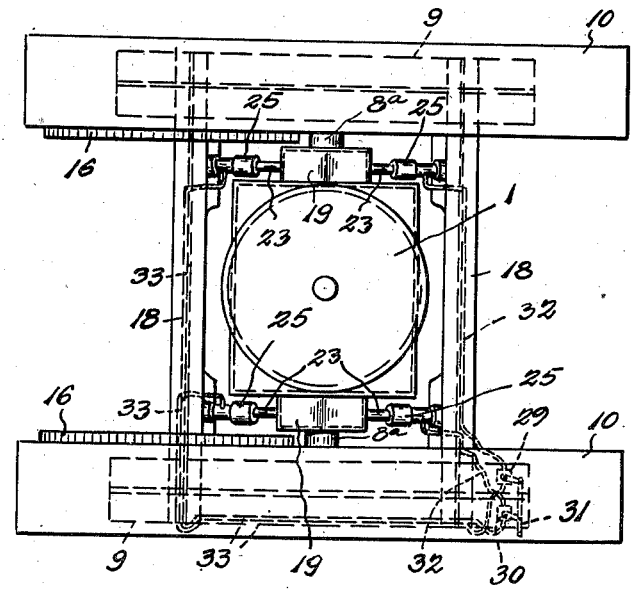
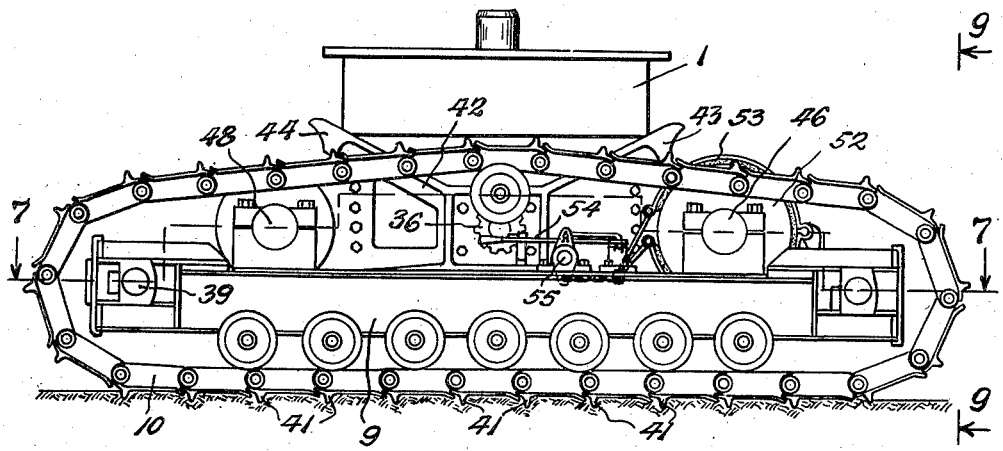

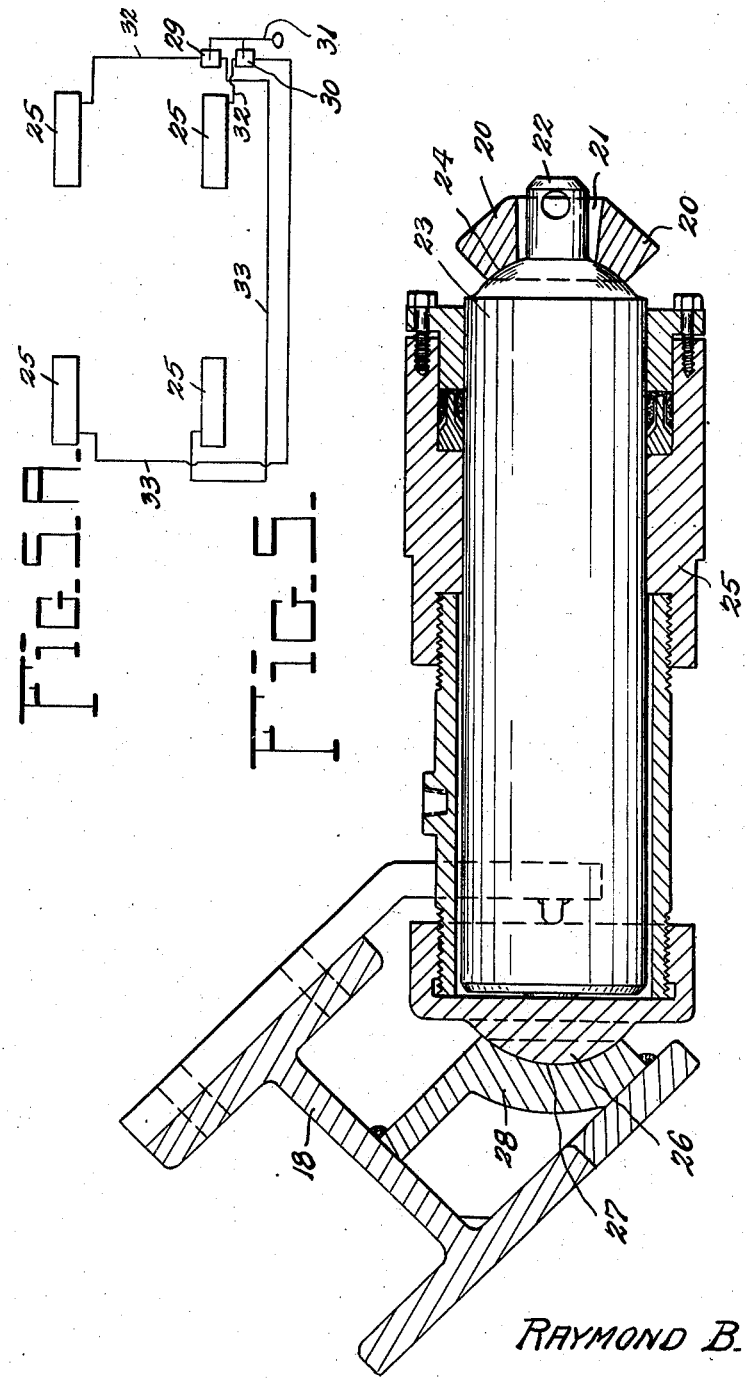

June 21, 1938.   R. B. DORWARD   2,121,189
CRANE EXCAVATOR
Filed Dec. 2, 1936   5 Sheets-Sheet 5

Inventor
RAYMOND B. DORWARD.
By Robb & Robb
Attorneys

Patented June 21, 1938

2,121,189

UNITED STATES PATENT OFFICE 2,121,189

CRANE EXCAVATOR

Raymond B. Dorward, Indianapolis, Ind., assignor to Insley Manufacturing Corporation, Indianapolis, Ind., a corporation Application December 2, 1936, Serial No. 113,890

16 Claims. (Cl. 212—69)

The present invention appertains to the art of portble cranes or excavating machines, including what are commonly known as shovel cranes, or excavator shovels, and the like. Modern machines of this type generally comprise a carbody or a cab which supports and contains the operating machinery for the traction and excavating devices, the same mounted upon a traction base which comprises a frame supported on traction members which are commonly called crawlers because they consist usually of endless belt traction devices. The invention is not limited to application necessarily to excavators having crawler or endless belt traction members, because, under certain conditions the principles of the invention might be carried out and have utility in conjunction with excavators the base frames of which are equipped with wheels, though few of such machines at the present time are in use.

In excavator cranes of the class above mentioned, the carbody and contained driving machinery, with the associated boom and bucket appliances for doing the excavating work, constitute a very heavy super-structure carried by the so-called crawler base. Under conditions of ordinary operation, the crawler base and the carbody with its contained machinery and associated excavating boom and bucket apparatus, work in a horizontal plane. In fact, said carbody and associated parts, and the crawler base, are so connected together that when the crawler base is supporting or carrying the super-structure up or down sloping ground, the carbody and supported parts will be inclined at the same angle to the horizontal as the said crawler base. Obviously, owing to the weight and general disposition of the super-structure upon the crawler base, involving the center of gravity and stability of the said super-structure, the excavating machinery of the super-structure cannot be operated if the crawler base and said super-structure are set at a very appreciable inclination to the horizontal.

At the present time excavating cranes of the type of the invention are used very considerably for the digging of trenches for pipe lines. These pipe lines are excavated across country, and the pipe line ditch usually runs up and down hills, dependent upon the character of the terrain in which the pipe line is being built. The usefulness or serviceability of excavating cranes for the up and down-hill digging work above referred to is limited by the angle which the machine must travel incident to the slope of the ground over which it traverses.

In order that machines of the type of the invention may work with greater facility in reference to operation on sloping ground, uphill and downhill, I have redesigned the mounting of the super-structure unit comprising the carbody, contained machinery, and excavating apparatus, in reference to the supporting or traveling base which is, as mentioned before, of the crawler type, but might be of the wheel type. The mounting which involves the important novelty of my invention comprises a mode of connection of the said super-structure with the traveling base so that the super-structure may be adjusted relatively to the base about a horizontal axis of movement such that the base may be positioned so that it inclines upwardly relatively to the super-structure when the base supports the super-structure, including the excavator device, on upwardly sloping ground, with the excavating devices working in advance of the machine. In like manner, when the base is supported on downwardly sloping ground, the front end of the crawler unit may be adjusted to incline downwardly relatively to the carbody and associated supported parts, the latter remaining in horizontal working positions and not, therefore, affected by the inclination of the surface on which the machine is being carried.

In other words, from the foregoing it will be understood that I provide suitable means in my excavator crane construction whereby the carbody, contained machinery, and excavating devices, constituting one unit, may be tilted in either of opposite directions relatively to the supporting traveling base constituting the other unit, in order that the superstructure on the traveling base may be maintained horizontal, or as close to horizontal as required for proper efficient action of the excavating devices, notwithstanding that the base is disposed in an inclined position to the horizontal.

A special feature of the invention resides in provisions of mechanical operation such that the weight of the excavating apparatus (boom, dipper stick, bucket and directly associated parts) may be availed of to cause the relative tilting of the base and crane superstructure carried thereon, obviating the need of a motor for such purpose.

Now the means for accomplishing the desired result of obtaining the tilting mounting of the crane superstructure relative to the traveling base may take different forms, and I do not wish to be limited to the forms of construction which are described in the following specification and illustrated in the annexed drawings. In the accompanying drawings—

Figure 1 is a side elevational view of a shovel type crane excavator embodying a crawler base and illustrating the general principle of the invention in respect to the relative tiltability of the base structure and the superstructure comprising the carbody, contained machinery, and boom and bucket apparatus.

Figure 2 is a view showing the lower portion of the superstructure that supports the platform and upper portion of the excavator illustrating fluid operated means for effecting the tilting of the crawler base in relation to said superstructure.

Figure 3 is a fragmentary plan view to show more fully certain parts of the construction of Figure 2, the fluid operated cylinder and piston units being omitted from their proper positions in which they are shown in Figure 2, certain parts for driving the illustrated crawler member being shown.

Figure 4 is a plan view illustrating more fully the construction of the device shown in Figures 2 and 3 the superstructure of the excavator omitted to enable certain parts to be more readily seen.

Figure 5 is a sectional view of one of the fluid operated cylinder and piston units, showing the mounting thereof between the lower portion of the carbody and the crawler base.

Figure 5a is a diagrammatic view showing more fully the arrangement of the fluid pressure lines communicating with the various piston and cylinder units of the fluid operated mechanism of Figure 2.

Figure 6 is a side view of the lower portion of the carbody of the crane superstructure and a modified form of crawler base, connecting means therefor permitting the base to have relative movement tiltable about an axis point transverse to the direction of travel of the excavator.

Figure 7:
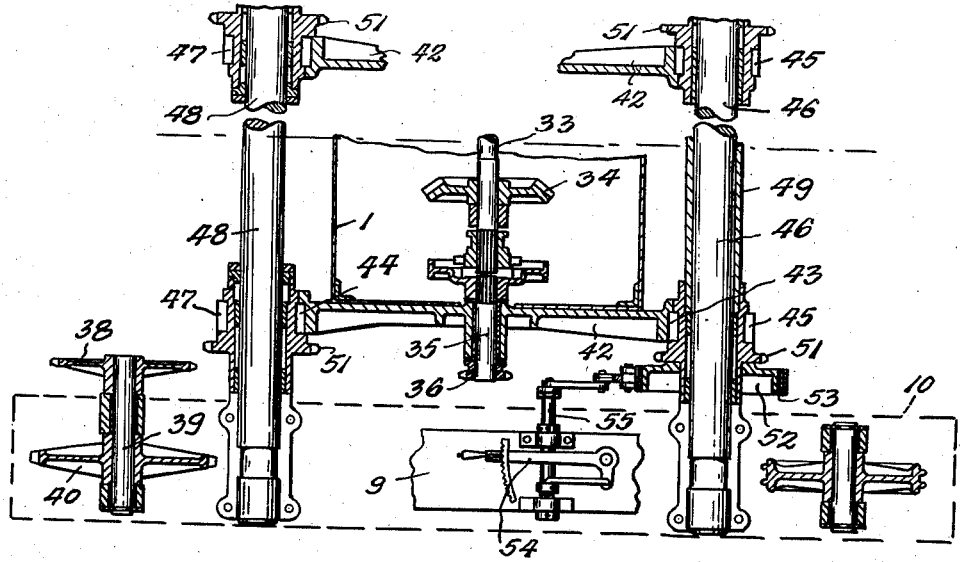

Figure 7 is a horizontal sectional view, certain parts broken away, showing certain of the driving mechanism for the crawlers of the crawler base and the adjusting mechanism for effecting relative tilting of the crawler base to the supported superstructure, together with one of the brake units for holding the crawler base and its superstructure in relatively tilted or other positions adapted to be assumed thereby.

Figure 8:
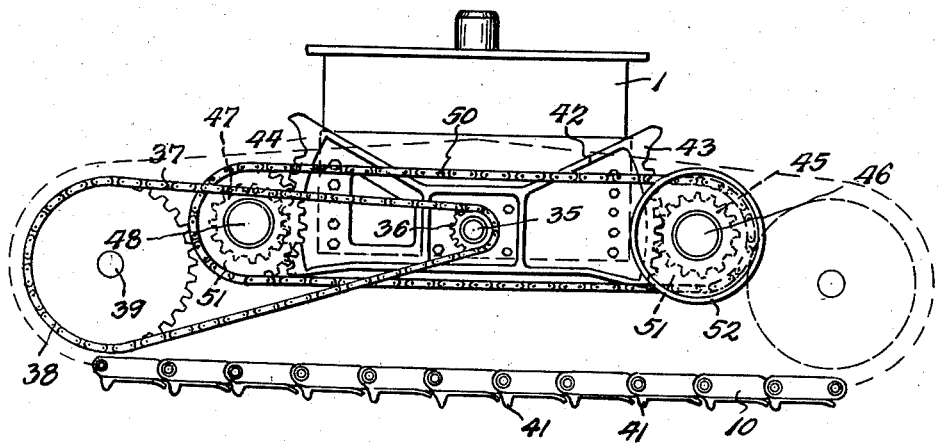

Figure 8 is a side view showing more clearly certain of the parts of the modified form of tilting mechanism of Figures 6 and 7, involving the use of gear sectors carried by the lower portion of the superstructure and engageable with operating and idler pinions supported by parts of the crawler base.

Figure 9 is a fragmentary end view of certain of the sector and pinion parts illustrated in Figure 8.

Referring to Figure 1 of the drawings, there is illustrated a shovel type of crane or excavator comprising the superstructure comprising a carbody including the platform or lower body member 1 on which is provided the turntable that carries the carbody or cab 2, the usual rollers 3 being interposed between the two. The carbody 2 contains the operating machinery for the excavating apparatus which includes the boom 4, dipper 5, and bucket 6. The excavating apparatus comprising the parts mentioned may be operated by the customary drum and cable, or other driving instrumentalities commonly used and of various types in this class of excavating machines. The carbody with its excavating apparatus is adapted to revolve upon the crawler body member 1, and usually during travel of the excavator, the boom and bucket apparatus 4, 5, and 6 will be disposed at the end of the machine constituting the front end according to whether the traveling movement be in one direction or the other.

In Figure 1 the dotted lines show the crawler base in different angular positions; in fact, reverse angular positions in relation to the superstructure comprising the parts 1, 2, and associated driving and excavating apparatus. The full lines in Figure 1 show the crawler or travel base disposed in a plane parallel with the lower body member 1 and the floor of the carbody 2, positions which the parts will assume under ordinary conditions of excavating or digging operations. It will be understood that in order to maintain the superstructure of the crane relatively horizontal when the excavator is traveling to the right, as seen in Figure 1, and up or down hill, the crawler base will be inclined or tilted according to the dotted line position a, or a portion of the angle of such position, or, if the excavator be traveling to the left as shown in Figure 1, up or down hill, the excavating apparatus will preferably be reversed from the position of Figure 1 and the crawler base arranged in the dotted line angle b, or a portion of such angle, depending upon the steepness of the ascent or descent.

A preferred construction of the means for effecting the relative tilting of the crawler base or superstructure will now be described in conjunction with Figures 2, 3, 4, and 5. In Figure 3 the crawler base of the excavating machine is seen to comprise a drive shaft 7 extending the full width of the machine practically and connecting the two crawlers. The view Figure 3 illustrates about half of the base of the machine only, and it will be understood that the other half is substantially duplicated beyond the broken portion of the view. Triangular abutments 8, one of which is rigidly secured to each side of the lower body member 1, have rigid lateral trunnions 8a projecting therefrom. On each trunnion 8a is pivoted the adjacent casting 11 of the crawler frame 9, thus permitting each crawler 10 to pivot relatively to the base member 1 of the superstructure. By these means the base member 1 and superstructure thereon are permitted to tilt relatively to the crawler unit. At opposite ends shaft 7 carries pinions 12. Each pinion 12 meshes with a driven gear 13 mounted on a short shaft 14, see Figure 3, the inner end of which shaft carries a sprocket gear 15. The sprocket gear 15 is connected by a chain 16, see Figure 2, with a large driving gear 17 at one end of the crawler frame 9, and since the shaft 7 is adapted to be driven by the power machinery in the carbody 2 by suitable transmission gearing operating through the centerpin or axis of the said carbody, the crawlers 10 will be driven in forward or reverse directions, as desired, in this manner. The foregoing is substantially the conventional operation of crawlers in certain types of excavating machines at present in use.

The crawler frames 9 at opposite sides of the machine are connected together by transverse I-beams 18 as seen in Figures 2, 3, and 4, and thus the two crawlers are rigidly connected together so far as any tilting movement thereof is concerned, relatively to the superstructure carried thereby. Figure 4 illustrates the general arrangement of the crawlers and driving mechanism for the same.

To obtain the relative tilting movement of the crawler base including the crawlers 10, frames 9, and cross-beam 18, as before described, I provide a saddle member 19 on each of the abutments or offstanding members 8 of the lower body member 1. The saddle member 19 has upwardly inclined arms 20 which are provided with openings 21, see Figure 5, each opening receiving a stud on the upper end of a piston 23. Each arm 20 is also formed with a concave bearing 24 and the stud 22 is of somewhat less diameter than the opening 21 so as to allow a certain amount of play thereof within said opening. A piston and cylinder unit of a fluid pressure device cooperates with each of the arms 20 of the member 19, two of such units coacting with each crawler frame 9, one unit associated with each end of said frame. The piston and cylinder units referred to include the pistons 23 before mentioned and cylinders 25 in which said pistons operate. The lower ends of the cylinders are convexed as shown at 26 and are seated in concave bearings 27 in pillow blocks 28 carried by the associated crawler frame 9.

Now assuming the arrangement of the parts described to be as illustrated in Figure 4, it is obvious that by admitting a fluid pressure medium, oil, air, or the like, into the lower ends of the piston and cylinder units 23, 25 at one end of the crawler base, or its units associated with one of the cross-beams 18, and exhausting from the opposite pair of pistons and cylinder units 23 and 25 the pressure medium used, the end of the crawler base associated with the piston and cylinder units to which the pressure medium is supplied will be tilted relatively to the superstructure in a direction away therefrom. The other end of such crawler base will be tilted in the direction of such superstructure, and in this manner angular movement and adjustment of the crawler base will be effected relatively to the superstructure carbody and excavating mechanism; according to the construction just described, the said tilting movement of the base will be about an axis coincident to the axis shaft 7.

Obviously, if the pressure medium is admitted to the piston and cylinder units 23—25 opposite those above referred to as being supplied with said pressure medium, and the reverse operation of said units performed from that previously described, a reverse tilting or inclination of the crawler base structure relatively to the superstructure will be obtained. Now the instrumentalities for supplying the pressure medium to the piston and cylinder units may be of any suitable type. Thus, according to Figure 4 and the diagrammatic view Figure 5a, it will be seen that suitable control valve means 29 and 30 operated by a handle link 31 may be employed to cause the proper passage of the fluid pressure medium to the various piston and cylinder units, suitable pipe lines 32 for this purpose leading from the valve means to one pair of piston and cylinder units cooperating with one of the cross-beams 18, and other pipe lines 33 leading to the opposite pair of piston and cylinder units. The manner in which the fluid pressure medium in the pipe lines 32 and 33 is motivated to cause the operation of the piston and cylinder units may be the following, as one method. However, other methods may be resorted to within the purview of the invention.

Assuming the parts of the excavating machine to be in the positions of Figure 1 and the excavator is supported and about to travel up an ascent in the plane c, as designated in Figure 1, in relation to the horizontal indicated by the line d, the operator will actuate the fluid pressure control valves 29—30. Assuming that the parts of the excavator are in the full line positions of Figure 1, it is desirable that the superstructure tilt downwardly in a rightward direction relatively to the crawler base in order that said superstructure may be brought as nearly horizontal as practicable. Therefore, the operator in actuating the valve devices 29—30 will release the fluid pressure medium in the right-hand piston and cylinder units 23—25 and permit the pressure medium to pass through the pipe lines to the left-hand piston and cylinder units. Upon such release, controllably effected by the valve device, so that the degree of movement of the fluid pressure medium may be relatively slow, the superstructure will tilt downwardly and rightwardly until the horizontal may be reached, whereupon the valve parts 29 and 30 are closed to lock the fluid pressure medium and thereby lock the pistons in the various piston and cylinder units from movement. In this way, the superstructure is maintained definitely adjusted or locked in the proper tilted position in relation to the crawler base, and, according to Figure 1, the parts will have assumed the positions in which the crawler base is illustrated at $a$ and the superstructure parts are illustrated in full lines.

Should the angle of adjustment of the crawler base be desired to be opposite that shown in Figure 1, an operation reverse precisely to that above described in obtaining the adjustment $a$ of said crawler base will be performed. In other words, the carbody 2 will be rotated on its turntable or platform of the body member 1 to a position opposite that of Figure 1, and the operation of the valve mechanism set forth will cause the crawler base to assume the position in dotted lines indicated at $b$ in Figure 1, with the superstructure oppositely arranged to the position shown in dotted lines in said figure.

The modification of the invention illustrated in Figures 6, 7, 8 and 9, largely involves the use of pinion and gear mechanism, and associated brake parts, for accomplishing the relative tilting of the carbody or superstructure of the excavator relatively to the crawler base. Referring to Figure 7, the crawler base and gear mechanism above referred to is illustrated sufficiently for an understanding of the modification, in conjunction with the other figures last referred to. In Figure 7, which is a horizontal sectional view looking downwardly upon the crawler base mechanism and the lower body member 1 of the excavator, there will be seen the horizontal drive shaft 33 which is operated by the driving machinery and motor in the carbody 2 through the use of suitable transmission gearing adapted to actuate the bevel gear 34. Now this shaft 33 is adapted to be clutched to a relatively short driven shaft 35, one of which only is illustrated for one of the crawlers 10, but one of which is located at each end of the shaft 33. The shaft 33 is adapted to be driven in opposite directions in order to propel the excavator forwardly or rearwardly on its crawler base.

The particular clutch or drive mechanism used for connecting the shaft 33 and the driven shafts 35 is not material to the invention because various types of such mechanisms may be employed so long as the shafts 35 may be revolved in opposite directions.

At its outer end each shaft 35 is equipped with a drive sprocket 36 connected by a sprocket chain 37, see Figure 8, with a large driven sprocket 38 on the driving tumbler shaft 39 at one end of the adjacent crawler 10. Each shaft 39 carries the usual driving tumbler 40 for the crawler belt or traction member 1, as seen in Figure 8, and has its links preferably equipped with cross cleats 41 for more effective holding of the traction or crawler base of the machine against unauthorized movement on sloping terrain.

Carried by the lower body member 1 of the excavator superstructure and rigid therewith are segment members 42 located at the opposite sides of the member 1. Each segment member 42 is equipped at its opposite ends with gear segments 43 and 44, and the teeth of the gear segment 43 are in mesh with the teeth of a supporting and actuating pinion 45 on one of the supporting shafts 46 employed to connect one end of the crawler frame with the body member 1. The teeth of the other gear segment 44 of the member 42 are in mesh with the teeth of another supporting and actuating pinion 47 on the other supporting shaft 48 for connecting the opposite ends of the body member 1 with the crawler unit.

In other words, generally speaking, it may be stated that the lower body member 1, carbody 2, and other parts which constitute the superstructure of the excavator are carried and fully supported by the two segment members 42, see Figure 7, and the four pinions above described, two pinions 45 on the shaft 46 and the other two pinions 47 on the shaft 48. The pinions 45, while supported by the shaft 46 are directly mounted upon and keyed or otherwise secured to a sleeve shaft 49 rotative on the shaft 46. On the other hand, the pinions 47 are directly mounted upon and freely rotative relative to the shaft 48.

As seen in Figure 8, the pinions 45 and 47 at each side of the machine are connected together by means of a sprocket chain 50 passing around sprockets 51 integral with the pinions, so that any movement communicated to the pinions 45 will be correspondingly transmitted, to the same extent, to the pinions 47, and vice versa. Keyed or otherwise secured to the sleeve 49 that carries the parts 45 and 51, are two brake drums 52, one at each side of the machine, or, in other words, one at each end of the sleeve shaft 49, they being adapted to turn with said shaft 49. Associated with each brake drum 52 is a brake applying and release mechanism comprising suitable brake band means 53, see Figures 6 and 7, and hand-operated devices for actuating the brake band means 53 to apply and release the same in relation to the associated drums 52. The hand-operated means may in each instance have the hand lever 54, the shaft 55, and suitable linkage connections for rocking the shaft 55 in opposite directions and for transmitting the rocking movement to link parts attached directly to the brake band parts 53. The brake unit and actuating parts just described as being associated with each brake drum 52 is designed so as to enable a braking action to be applied to each drum 53 for efficient braking effect to hold the carbody 2 in fixed position relative to the lower body member. Each brake unit and the actuating means therefor may therefore be of any desired type to function in the manner stated, within the purview of the invention.

The segment members 42 are so disposed on the lower body member 1 of the excavator superstructure that they are adapted to rotate about an axis substantially coincident with the axis shafts 35, having in view the mode of supporting and interengaging the gear segments 43 and 44 of each member 42 with the supporting and actuating pinions 45 and 47 at each side of the machine.

With the foregoing construction in mind, the modified adaptation of my invention may be operated in the following manner. It will be assumed that the excavator is set level on level ground with the parts in the full line positions of Figure 1. As the machine climbs a grade, which becomes steeper and steeper, at a certain point the revolving superstructure will be so greatly out of level that the excavating devices cannot satisfactorily perform their functions. When this point is reached in the travel of the machine, the carbody 2 is swung so as to bring the boom 4 in line with or substantially parallel to the crawler members 10, said boom 4 and its supported dipper parts 5 and 6 being disposed so as to project from the end of the machine in the direction toward which the revolving superstructure is required to be tilted in order to bring it to or toward a level or horizontal position. This done, the ground man or operator for the excavator will release one of the brake units 53 by manipulating the control lever 54 therefor. He will then go around to the opposite side of the machine and release the other of the brake units 53 by means of its control lever 54, easing off on this second brake unit gradually until the weight of the superstructure and projecting boom and bucket apparatus, caused by the lifting of the bucket 6 primarily, will tilt the superstructure forwardly in the desired direction and sufficiently to level the same to compensate for the slope of the grade on which the crawler base of the machine is located. The rate of movement of the superstructure in arriving at its proper position will be controlled by the last brake eased off or released in the manner stated, by the ground man, and when the superstructure of the excavator reaches the desired level, the ground man will actuate a lever 54 and lock this brake by which he has controlled the tilting movement stated. Thereupon, the ground man will go around to the other side of the machine and lock the other brake in braking position. The excavator under these conditions is ready to go forward with its operation. According to the preferred construction of my machine, the movement of the superstructure of the excavator relatively to the crawler base is a maximum of 18° in either direction toward the opposite ends of the crawlers 10.

Although it is desirable to dig and level rights of way on a grade as steep as 45°, I have found it preferable to limit the angle of adjustment as above given to 18°, having in mind keeping the size and height of the excavator within certain practical limits. Effectively, the said 18° of movement of the superstructure relatively to the crawler base is equivalent to a slope of 32½%. Therefore, in the extreme cases where work is to be done on a 45% slope, the machine will be operated out of level 12½%. However, an excavator can very readily operate efficiently when out of level an amount no greater than 12½%, whilst it cannot operate when the superstructure is out of level as much as 45%.

The cleats, lugs, or grousers 41 preferably supplied for the crawlers 10 are intended to prevent the excavator from sliding downgrade and from slipping around when the machine is accelerated in swinging or stopping suddenly. Since the machine is on a slanting grade under such conditions, the tendency for slippage downgrade is greatly increased.

Since the carbody 2 may be fully revolved on the lower body member 1, the boom and bucket excavating apparatus carried by the carbody 2 can be readily moved to project from either end of the crawler base, and therefore cause the weight thereof to overbalance the superstructure for tilting same and correspondingly tilting the segment members 42 downwardly in the direction of either end of the said crawler base. The movement downwardly of the corresponding right ends of the segments 42, as seen in Figure 9, on the release and easing off of the brake units simply causes a rotation of the pinions 45 and the pinions 47. In one instance these pinions will be rotated clockwise, and when the tilting is in an opposite direction, they will be rotated counter-clockwise. Necessarily, each pinion 45, being connected to the pinion 47 on the same side of the machine, by the associated sprocket chain 37, the pinions must rotate simultaneously. Within the purview of the invention the pinions 47 on the shaft 48 could be carried by a sleeve shaft similar to the shaft 49, though such construction is not necessary and would be more expensive and require accuracy of construction and adjustment of parts not required according to the illustrated modification.

It is within the contemplation of this invention, if it be desired not to utilize the preponderance of weight, established by the excavating apparatus at one end of the carbody, 2, as the motivating means to tilt the said carbody, to resort to the employment of positive actuating mechanism driven from the power unit in the carbody 2 for shifting the gear mechanism of the last described modification, whereby to accomplish the desired tilting of the superstructure of the excavator in the proper direction. Or, again, a positively moved pressure fluid medium could be supplied to the fluid pressure devices described in relation to Figures 1, 2, 3, 5, and 5a for actuating the pistons 23 in the cylinders 25 and thus not having to rely upon the weight of the said excavating apparatus comprising the parts 4, 5, 6, etc.

As stated before, the principles of construction and operation of the invention may be employed in conjunction with portable cranes, and, while particularly adapted for excavating crane types the invention is not limited thereto. Lifting cranes involve operating apparatus including boom and other devices which may be shifted on the crane body to provide a preponderance of weight at one or the other of the ends of the crane, so as to obtain the actuating function which has been described herein in reference to the excavating boom and bucket apparatus insofar as effecting the tilting of the carbody and its superstructure relatively to the traction means, may be concerned. The claims hereof are therefore to be read in the light that the crane structure may have excavating or any equivalent apparatus that may create the desired preponderance of weight at one or more sides of the carbody for the purposes referred to.

Having thus described my invention, what I claim as new and desire to secure by Letters Patent of the United States, is—

1. In a portable crane, in combination, a travel base, a superstructure thereon comprising a carbody and operating apparatus carried thereby, connecting means between the base and superstructure permitting the latter to revolve upon the base so that said apparatus may extend in the direction of either end of the travel base, and instrumentalities between the travel base and superstructure operable by the preponderance of weight created by said apparatus on the superstructure allowing relative tilting of the superstructure and travel base so that the travel base may assume an angle to the superstructure as when moving up or down slopes of ground, while the superstructure is maintained substantially level or horizontal.

2. In a portable excavating machine, a travel base, a superstructure thereon comprising a carbody, operating machinery carried by said carbody, excavating apparatus including boom and bucket devices extending laterally from the carbody and operable by the machinery therein, and instrumentalities connecting the travel base and said superstructure and operable by preponderance of the weight of the excavating boom, bucket apparatus and superstructure with respect to the base to permit relative tilting movement of the said superstructure and travel base.

3. In a portable excavating machine, in combination, a travel base, a superstructure mounted thereon and tiltable relative thereto and including a carbody rotatable relatively to the travel base, boom and bucket excavating apparatus extending from and supported by the carbody at one side thereof and adapted to be shifted with the carbody so that the weight of said apparatus may be applied to the carbody when the apparatus is disposed in a direction toward either end of the travel base, and instrumentalities movably connecting the travel base and said superstructure whereby bodily tilting of the travel base relatively to the superstructure, to assume a climbing angle whilst the superstructure remains substantially level, is permitted, and means to control said instrumentalities so that the application of the weight of the boom and bucket excavating apparatus to the carbody, whilst said apparatus is disposed in the direction of either end of the travel base, may compel a relative tilting of the superstructure and travel base in the direction of the end of the travel base toward which said excavating apparatus is disposed.

4. In a portable crane excavator, in combination, a traction supporting and travel base, a superstructure thereon comprising a carbody containing operating machinery, and operating apparatus on the superstructure operable to cause relative tilting of the latter and the travel base, means for controlling the relative tilting of the superstructure and travel base for maintaining the superstructure substantially horizontal when the travel base is at an angle thereto in climbing up and down inclined terrain.

5. In a portable crane excavator, in combination, a traction supporting and travel base, a superstructure thereon comprising a carbody containing operating machinery and operating apparatus to be actuated by said machinery, and connections between the superstructure and base whereby relative tilting of the two may be caused by shifting the weight of the said apparatus to shift the center of gravity of the superstructure and operating apparatus, and means to control the speed and extent of such tilting.

6. In a portable crane excavator, in combination, a traction supporting and travel base, a superstructure thereon comprising a carbody containing operating machinery, means connecting the base and superstructure so that the two may tilt relatively to each other, whereby the base may incline upwardly or downwardly in its direction of travel while the superstructure remains substantially level, excavating means on the superstructure to positively actuate the same to effect the relative tilting, and instrumentalities to control the speed and extent of such tilting.

7. In a portable crane excavator, in combination, a traction supporting and travel base, a superstructure thereon comprising a carbody containing operating machinery, means connecting the base and superstructure so that the two may tilt relatively to each other, whereby the base may incline upwardly or downwardly in its direction of travel while the superstructure remains substantially level, excavating means on the superstructure to positively actuate the same to effect the relative tilting, pressure means to limit the extent of tilting, and control devices for the last means to govern the speed of tilting.

8. In a portable crane excavator, in combination, a traction supporting and travel base, a superstructure thereon comprising a carbody containing operating machinery, means connecting the base and superstructure so that the two may tilt relatively to each other, whereby the base may incline upwardly or downwardly in its direction of travel while the superstructure remains substantially level, means to positively actuate the superstructure to effect the relative tilting, and brake instrumentalities coacting between the base and superstructure to limit the degree and control the speed of tilting.

9. In a portable crane excavator, in combination, a travel base, a superstructure, excavating apparatus for positively actuating said superstructure to effect tilting thereof with respect to said base, said superstructure comprising operating machinery for propelling the base and actuating said excavating apparatus, cylinder and piston units interposed between the base and superstructure, said excavating apparatus being adapted to cause movement of a fluid medium in said units under the relative tilting of the superstructure and the base, so the base may be adjusted parallel with the inclination of terrain while the superstructure remains substantially level, and control mechanism for the fluid medium for regulating the speed and extent of tilting.

10. In a portable crane excavator, in combination, a travel base, a superstructure comprising operating machinery for propelling the base and actuating operating apparatus, a segment member on the superstructure, spaced gear segments, spaced pinions carried by the base disposed to mesh with and support the respective segments and thereby the superstructure, connections between the spaced pinions compelling their simultaneous movement, said operating apparatus being adapted to actuate the segments to operate the pinions and cause the segments and supported superstructure to tilt relatively to the base, and means to regulate the degree of relative tilting aforesaid.

11. A portable crane excavator as claimed in claim 10, wherein the last means also controls the speed of tilting.

12. In a portable crane excavator, in combination, a travel base, a superstructure comprising operating machinery for propelling the base and actuating excavating apparatus, a segment member on the superstructure, spaced gear segments, spaced pinions carried by the base disposed to mesh with and support the respective segments and thereby the superstructure, connections between the spaced pinions compelling their simultaneous movement, said excavating apparatus on the superstructure being operable to shift the center of gravity of the latter with respect to the base, and instrumentalities for preventing movement of the pinions to hold the segments and superstructure level with the base operable to release said pinions when the weight of the excavating apparatus is shifted with respect to the superstructure, whereby the latter and base will be caused to tilt relatively to one another.

13. A portable crane excavator as claimed in claim 12, in which the last means is constructed to control the speed of such relative tilting.

14. In a portable crane, in combination, a base, a superstructure thereon, comprising operating means carried thereby, and means for supporting said superstructure on said base so as to allow relative tilting of the superstructure and base upon operation of said operating means for causing displacement of the center of gravity of the superstructure with respect to said supporting means.

15. In a portable crane, in combination, a base, a superstructure thereon, comprising operating means carried thereby, means for supporting said superstructure on said base so as to allow relative tilting of the superstructure and base upon operation of said operating means for causing displacement of the center of gravity of the superstructure with respect to said supporting means, and instrumentalities for controlling the extent of such tilting.

16. In a portable crane, in combination, a base, a superstructure thereon, comprising operating means carried thereby, means for supporting said superstructure on said base so as to allow relative tilting of the superstructure and base upon operation of said operating means for causing displacement of the center of gravity of the superstructure with respect to said supporting means, and instrumentalities for controlling the speed and extent of such tilting.

RAYMOND B. DORWARD.